(12) United States Patent
Braud

(10) Patent No.: US 8,870,234 B2
(45) Date of Patent: Oct. 28, 2014

(54) RETRACTABLE HYDROCARBON CONNECTOR

(75) Inventor: Jean Braud, La Turbie (FR)

(73) Assignee: Single Buoy Moorings Inc., Marly (CH)

( * ) Notice: Subject to any disclaimer, the term of this patent is extended or adjusted under 35 U.S.C. 154(b) by 306 days.

(21) Appl. No.: 13/144,171

(22) PCT Filed: Jan. 13, 2010

(86) PCT No.: PCT/EP2010/050351
§ 371 (c)(1),
(2), (4) Date: Jul. 12, 2011

(87) PCT Pub. No.: WO2010/081826
PCT Pub. Date: Jul. 22, 2010

(65) Prior Publication Data
US 2011/0266793 A1 Nov. 3, 2011

(30) Foreign Application Priority Data
Jan. 13, 2009 (EP) .................................... 09150451

(51) Int. Cl.
*F16L 21/00* (2006.01)
*B63B 22/02* (2006.01)
*F16L 37/62* (2006.01)
*F16L 37/00* (2006.01)

(52) U.S. Cl.
CPC ............... *F16L 37/62* (2013.01); *B63B 22/026* (2013.01); *B63B 22/023* (2013.01); *F16L 37/002* (2013.01); *Y10S 285/92* (2013.01)
USPC ........... 285/302; 285/404; 285/920; 166/338; 166/340; 166/341

(58) Field of Classification Search
USPC ............. 285/18, 24, 27, 101, 307, 920, 404, 285/302; 166/338, 340, 341
See application file for complete search history.

(56) References Cited

U.S. PATENT DOCUMENTS

| | | | | |
|---|---|---|---|---|
| 2,887,124 A | * | 5/1959 | Mehl | 137/614.06 |
| 2,962,096 A | * | 11/1960 | Knox | 285/920 |
| 3,098,525 A | * | 7/1963 | Haeber | 166/348 |
| 3,099,317 A | * | 7/1963 | Todd | 285/39 |
| 3,325,190 A | * | 6/1967 | Eckert et al. | 166/341 |
| 3,695,633 A | * | 10/1972 | Hanes | 166/340 |
| 4,188,050 A | * | 2/1980 | Lochte | 166/341 |
| 4,441,741 A | * | 4/1984 | Galle, Jr. | 166/340 |
| 4,441,742 A | * | 4/1984 | Owens, III | 166/340 |
| 4,477,105 A | * | 10/1984 | Wittman et al. | 285/920 |
| 4,708,376 A | * | 11/1987 | Jennings et al. | 285/920 |

(Continued)

FOREIGN PATENT DOCUMENTS

GB 2 004 341 A 3/1979
WO 93/24731 A1 12/1993

OTHER PUBLICATIONS

International Search Report, dated Apr. 6, 2010, from corresponding PCT application.

*Primary Examiner* — David E Bochna
(74) *Attorney, Agent, or Firm* — Young & Thompson

(57) ABSTRACT

A connector for a hydrocarbon system includes a first duct section, a first connector part slidably attached to the first duct section for connecting to a complementary connector part attached to a second duct section and a retraction member for moving the first connector part in an axial direction between an extended position and a retracted position.

8 Claims, 4 Drawing Sheets

(56) References Cited

U.S. PATENT DOCUMENTS

Figure 1:
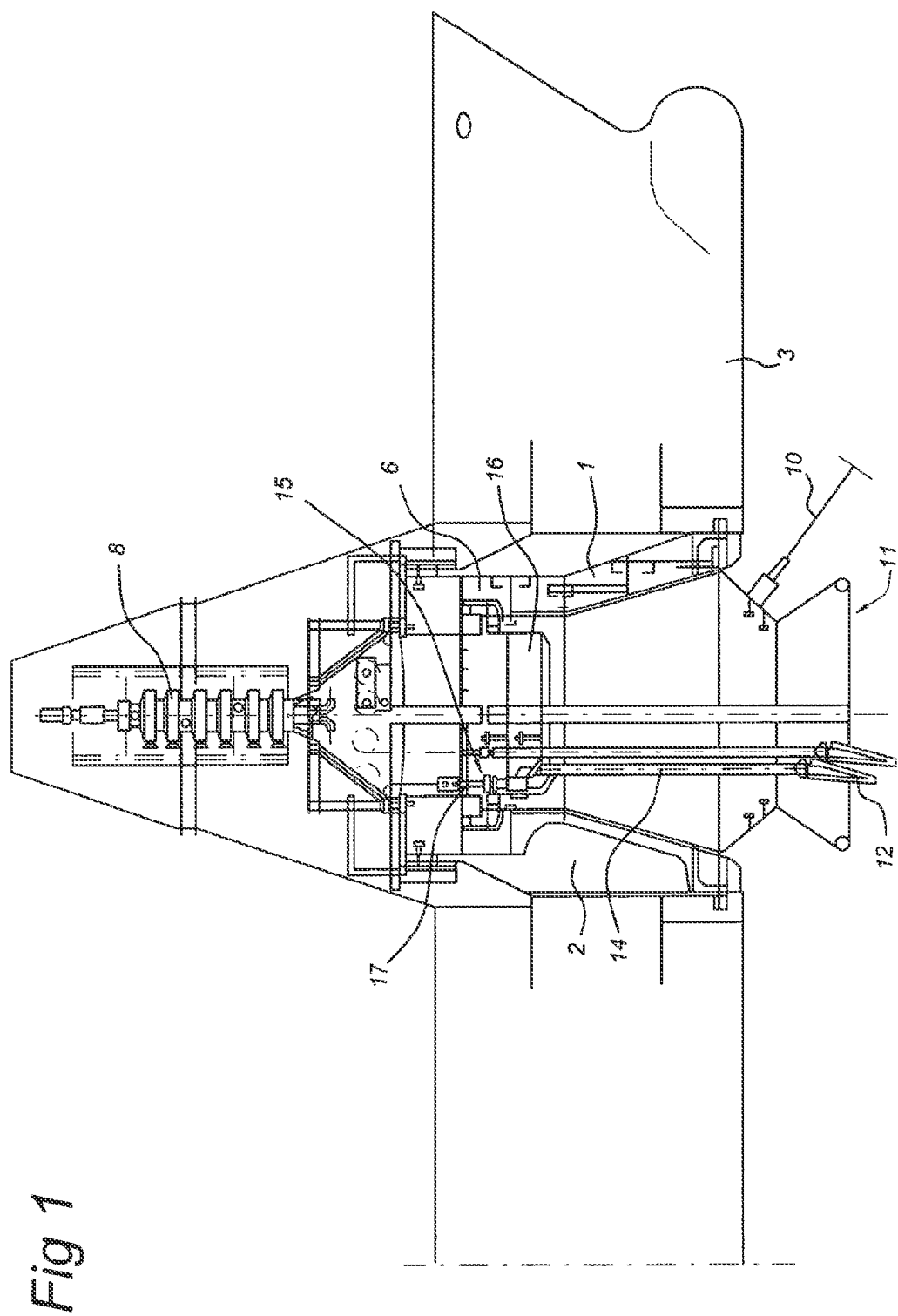

| | | | |
|---|---|---|---|
| 4,902,044 A * | 2/1990 | Williams et al. | 166/340 |
| 5,158,141 A * | 10/1992 | Saliger et al. | 166/341 |
| 6,089,321 A * | 7/2000 | Morrill | 166/341 |
| 6,334,633 B1 | 1/2002 | Nguyen et al. | |
| 6,793,019 B2 * | 9/2004 | Rodgers et al. | 166/340 |
| 7,686,087 B2 * | 3/2010 | Pallini et al. | 166/338 |
| 8,499,838 B2 * | 8/2013 | Fraser et al. | 166/338 |
| 8,511,387 B2 * | 8/2013 | Fraser et al. | 166/341 |

\* cited by examiner

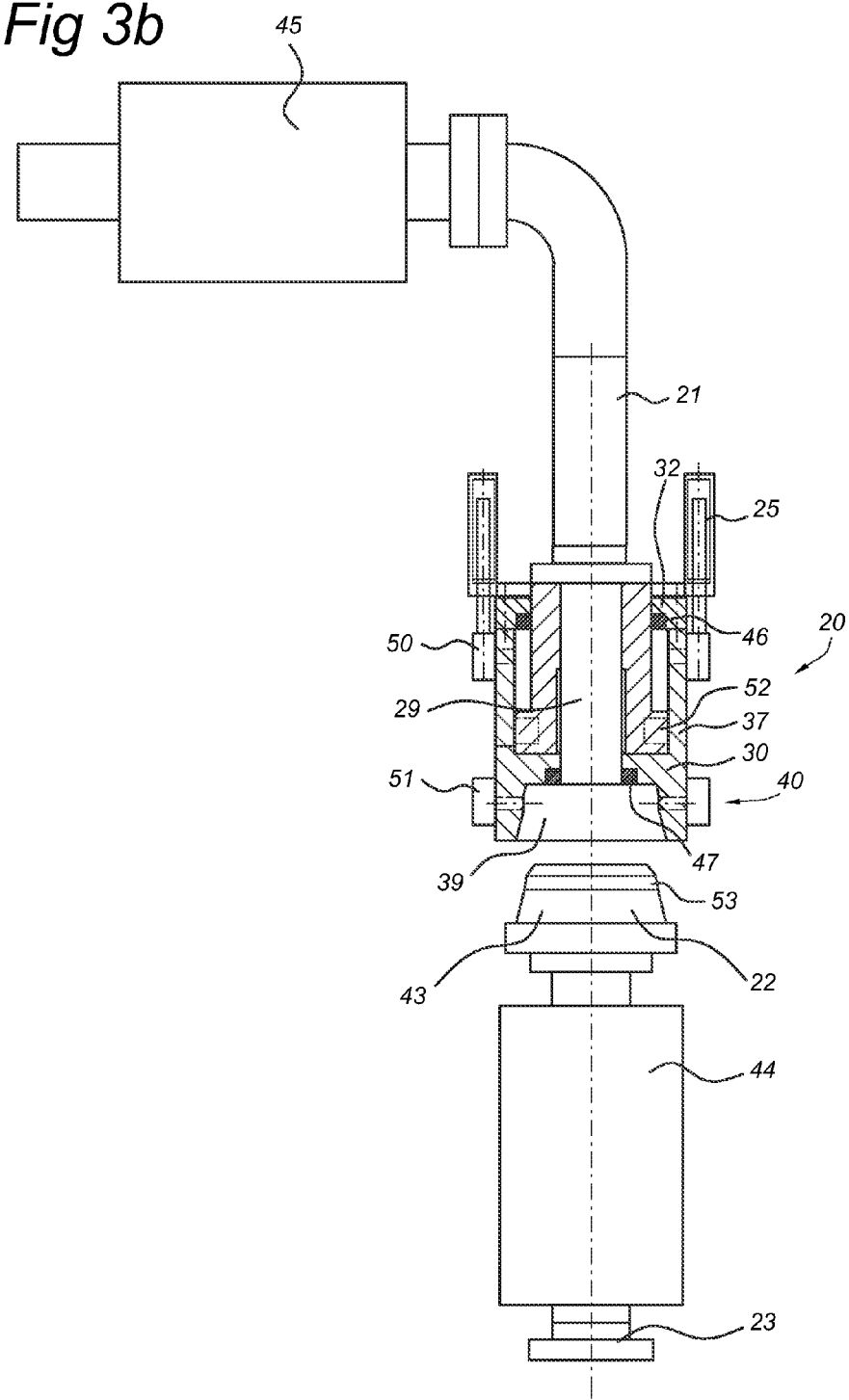

RETRACTABLE HYDROCARBON CONNECTOR

BACKGROUND OF THE INVENTION

The invention relates to a connector for a hydrocarbon system.

DESCRIPTION OF THE RELATED ART

In offshore applications, Floating Production Storage and Offloading systems (FPSO'S) are moored to the sea bed via a riser supporting buoy which is locked into a conical cavity at the bottom of a turret. The turret is rotatably supported in a moonpool of the vessel and is releasably connected to the riser supporting buoy. Risers extend from a subsea hydrocarbon well to the buoy and via the buoy to piping in the turret. On the turret, a swivel stacks connects the stationary fluid ducts in the turret to fluid ducts on the vessel such as to be able to rotate in relation to the stationary risers together with the weathervaning vessel. Anchor lines are attached to the buoy for mooring the vessel in position.

In case of severe weather conditions, the mooring buoy is released from the vessel and sinks to a predetermined depth below the wave active zone. Upon reconnection, the buoy is hauled into the cavity of the FPSO and is locked into place. When the riser termination ends are aligned with the piping on the vessel, the risers can be connected to the piping and hydrocarbons can be supplied from the subsea well via the risers, the piping in the turret to the processing or storage facilities on the vessel.

SUMMARY OF THE INVENTION

It is an object of the invention to provide a connector of compact construction which can rapidly and reliably connect two hydrocarbon ducts. It is in particular an object of the invention to provide a connector which can rapidly and reliably connect hydrocarbon ducts on a riser supporting buoy to ducts on a turret in a receiving cavity.

Hereto a connector in accordance with the invention comprises a first duct section, a first connector part slidably attached to said first duct section for connecting to a complementary connector part attached to a second duct section and a retraction member for moving the first connector part in an axial direction between an extended position and a retracted position.

The ducts according to the invention can be brought into close mutual proximity and aligned for connection and can then be placed in a fixed position. Thereafter, the retraction member can be activated to axially extend one connector part to mate with the complementary connector part and to establish a fluid connection between the ducts. Since the alignment of the ducts takes place while these ducts are at a sufficient mutual distance, the risk of collision of the ducts and consequent damage is reduced.

The connector according to the invention may in one embodiment comprise a generally T-shaped core having a cylindrical part, a transverse part and a central channel connected to the first duct section for transport of hydrocarbons, a sleeve slidably around the core, having an upper and a lower transverse wall part contacting the core, a longitudinal wall extending between the transverse wall parts and defining at a lower end a tapering cavity for receiving a frusto-conical coupling head of the second connector part, at least one fluid pressure actuating member being connected with one end to the sleeve and with an other end to the core.

The connector is of compact design and can be fitted in the top part of the receiving cavity of the vessel. The sliding sleeve provides a relatively small size mechanically robust and liquid tight coupling. A valve assembly, for instance a double block and bleed ball valve, may be incorporated in each duct part, near a respective connector part in a compact design.

In an advantageous embodiment, a sealing ring is provided around the core between the transverse wall parts. When the sealing ring is pressed against the transverse part of the T-shaped core in the connected state, an effective seal is established preventing leakage of fluid along the outer surface of the cylindrical part of the core. A double barrier can be provided by a second seal at an outer surface of the lower transverse wall part for contacting the coupling head of the second connector part.

In a further embodiment the first connector means comprises a locking member attached to a lower part of the sleeve, movable in a direction transversely to the axial direction, having a pin extending through an opening in the longitudinal wall, the coupling head of the second connector part comprising a groove for engaging with the pin.

The locking member is of a relatively simple and compact design and maintains the ducts in a fluid tight relationship even under the influence of external forces, for instance wave-induced heave motions. In case of an emergency release the locking pins can be rapidly retracted to uncouple the duct sections on the vessel from those on the buoy.

BRIEF DESCRIPTION OF THE DRAWING FIGURES

Figure 2:
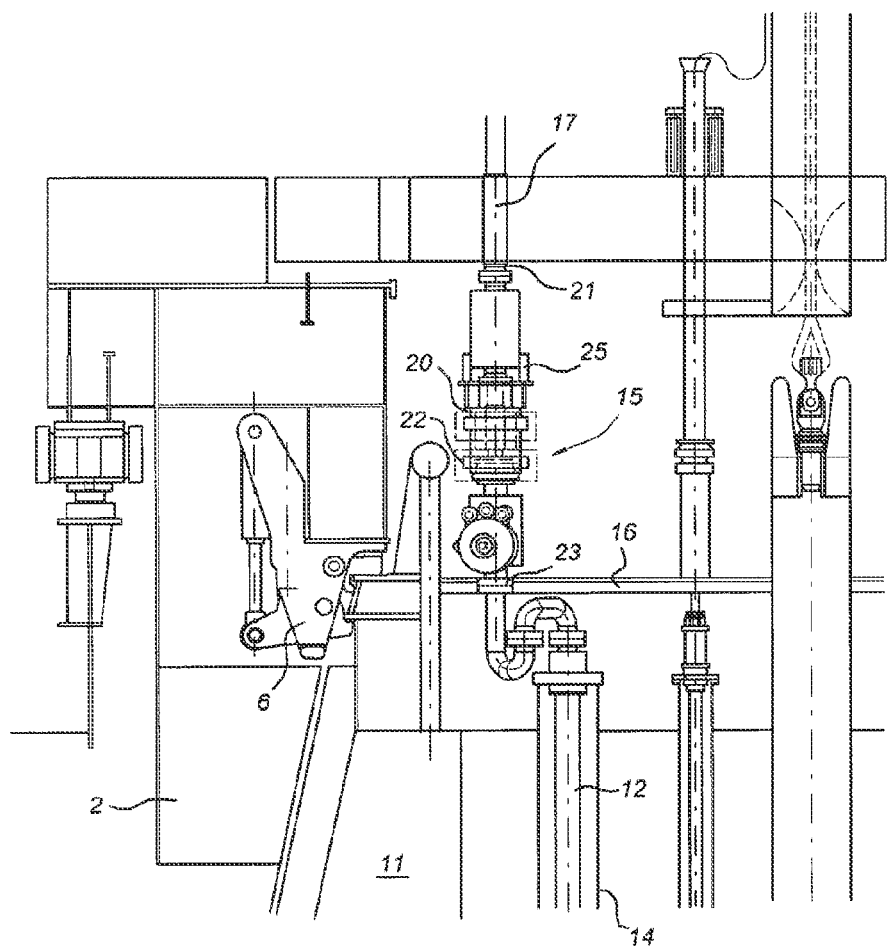
Figure 3A:
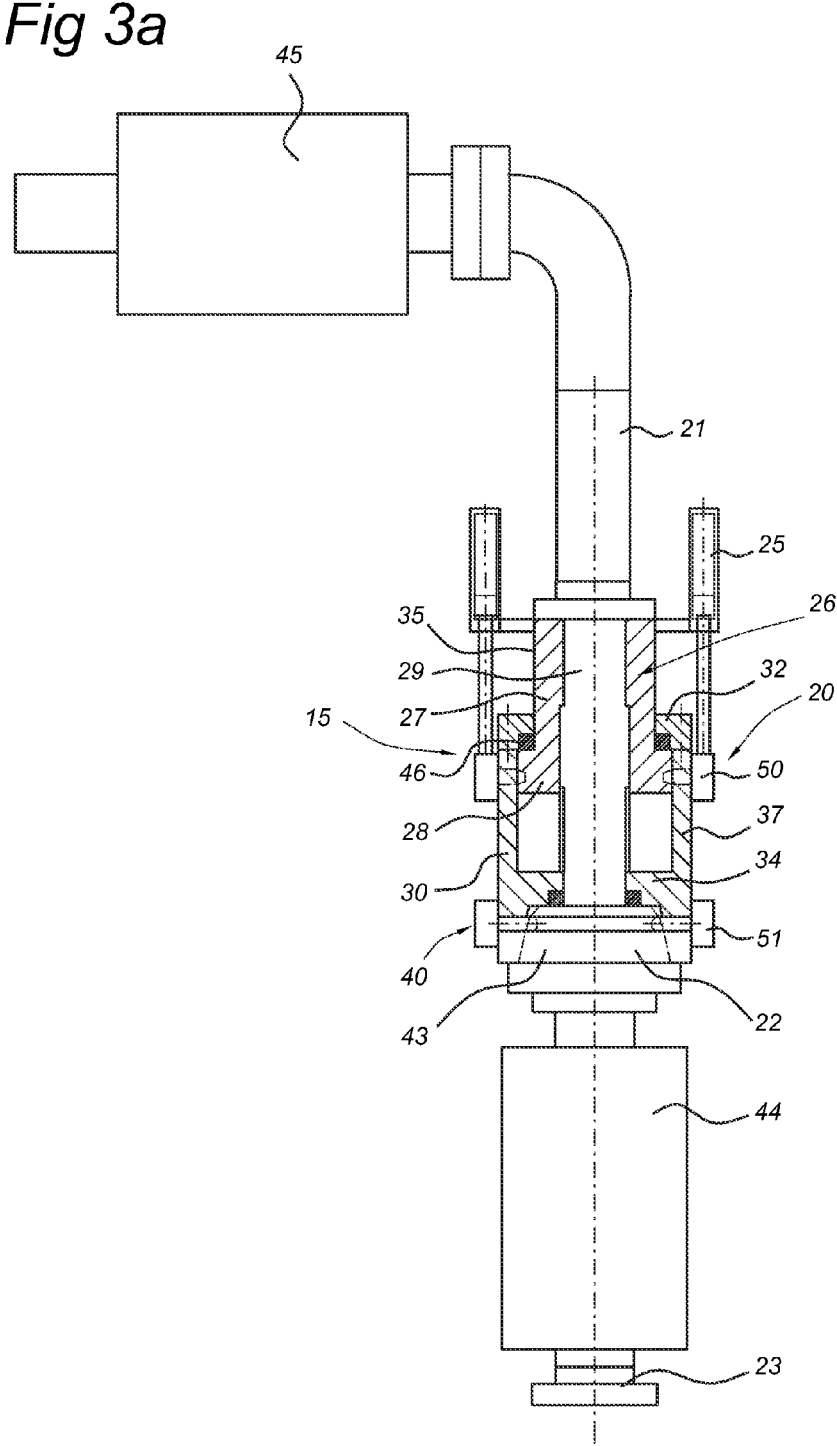

Some embodiments of a connector in accordance with the invention will be explained in detail with reference to the accompanying drawings. In the drawings:

FIG. 1 shows a partly cross-sectional view of a FPSO comprising a riser-supporting buoy and a connector according to the invention, FIG. 2 shows the interconnected fluid ducts at the top part of the buoy on an enlarged scale, and FIGS. 3a and 3b show the connector parts in their connected and disconnected state, respectively.

DETAILED DESCRIPTION OF THE INVENTION

FIG. 1 shows a hydrocarbon production vessel (FPSO) 3 anchored to the sea bed via anchor lines 10 that are attached to a riser supporting buoy 11. The riser-supporting buoy 11 is connected to a conical cavity 1 at the bottom of a turret 2 and is locked to the vessel via locking member 6. The vessel 3 can weathervane around the turret 2 to align itself with prevailing wind and current conditions. Risers 12 extend from a sub sea hydrocarbon well to the riser-supporting buoy 11 and are guided through tubes 14 in the buoy to an end connector 15 near the top 16 of the buoy 11. The end connectors 15 are detachably connected to hydrocarbon ducts 17 on the turret, which ducts 17 connect to swivels 8 and via those swivels to ducts on the vessel 3.

Upon detaching of the buoy 11, for instance in case of severe weather conditions, the connector 15 is released and the risers 12 can be lowered together with the buoy 11 to a desired depth below the wave active zone.

FIG. 2 shows the riser supporting buoy 11 and the connector 15 on an enlarged scale. The connector 15 comprises a first connector part 20 attached to upper duct section 21 and a second connector part 22 attached to lower duct section 23. The first connector part 20 comprises a retractable section attached to retraction member 25, for instance hydraulic cylinders, for movement of the retractable connector section in the axial direction (i.e. the length direction of the ducts 17).

FIG. 3a shows the connector parts 20, 22 in their connected position. The first connector part 20 comprises a T-shaped core 26 with cylindrical part 27, transverse part 28 and a central channel 29. On the T-shaped core 26, a sleeve 30 is slidably mounted. The sleeve 30 has an upper transverse wall 32 and a lower transverse wall 34, both walls abutting the outer wall 35 of the cylindrical part 27. A longitudinal wall 37 extends beyond the lower transverse wall 34 at a lower end 40 of the first connector part 20 such as to form a tapering cavity 39, as can be seen in FIG. 3b. In the cavity 39, the frusto-conical coupling head 43 of the second connector part 22 is received. Double block and bleed (insulation) valves 44,45 are attached to each duct section 21,23.

A first sealing ring 46 is placed against an inner surface of the upper transverse wall part 32 of the sleeve 30 and sealingly contacts the outer wall 35 of the cylindrical part 27 of the T-shaped core 26 and can slide together with the sleeve 30 up and down along the cylindrical part. A second seal 47 is placed in a groove in the lower transverse wall part 34 of the sleeve 30 such as to sealingly contact the coupling head 22.

In the coupled state as shown in FIG. 3a, the sleeve 30 is pushed downward by the hydraulic cylinders 25 such that the first seal 46 is pressed by the upper transverse wall part 32 against the transverse part 28 in a sealing manner. Upper locking pins 50 extend through openings in the longitudinal wall 37 into openings 52 in the transverse part 28. Lower locking pins 51 extend through openings in the lower end part of the longitudinal wall 37 of the sleeve 30 into a groove 53 in the connector part 22. The locking pins 50,51 may be actuated in a hydraulic or pneumatic manner.

Upon disconnecting the riser-supporting buoy 11 from the cavity 1, hydrocarbon production via the risers 12 is stopped. The insulation valves 44, 45 on both sides of the connector parts are closed and the duct section between valves 44,45 is depressurized and flushed with N2. The upper and lower locking pins 50, 51 are released and the sleeve 30 is retracted as shown in FIG. 3b.

For connecting the riser-supporting buoy to the cavity, the buoy is hauled into place via a winch and the connector 6 is operated to lock the buoy in position. Next, the riser ends are aligned with the piping 17 on the vessel while the sleeve 30 is retracted, such as shown in FIG. 3b. Thereafter the sleeve 30 is lowered by actuation of the hydraulic cylinders 25 and the upper and lower locking pins 50, 51 are engaged simultaneously. Then the sealing function of both seals 46,47 is tested, the valves 44,45 are opened and hydrocarbon production is started.

The invention claimed is:

1. A connector (15) for a hydrocarbon system comprising:
a first duct section (21);
a second duct section (23);
a first connector part (20);
a complementary, second connector part (22) attached to the second duct section (23), the second connector part (22) including a frusto-conical coupling head (43), wherein,
the first connector part (20) has
i) a sleeve (30) slidably attached to said first duct section and connectable to the second connector part (22), the sleeve (30) having an upper transverse wall (32) and a lower transverse wall (34),
ii) a generally T-shaped core (26) having a cylindrical part (27), a transverse part (28), and a central channel (29), the core (26) being fixedly connected to the first duct section (21) for transport of hydrocarbons,
the sleeve (30) being slidably around the core (26) in an axial direction between a retracted disconnect position and an extended connect position,
the upper and lower transverse walls (32,34) contacting the core (26),
iii) a longitudinal wall (37) extending between the upper and lower transverse wall (32, 34), a lower end (40) of the longitudinal wall (37) defining a tapering cavity (39) for receiving the frusto-conical coupling head (43) of the second connector part (22) in the connect position,
iv) a locking member (51) attached to the sleeve (30) and axially extendable with the sleeve, and
v) a retraction member (25) for moving the first connector part in the axial direction between the extended position and the retracted position, the retraction member comprising at least one fluid pressure actuating member (25) connected with one end to the sleeve (30) and with another end to the core (26).

2. The connector (15) according to claim 1, further comprising:
a first sealing ring (46) placed against an inner surface of the upper transverse wall (32) and sealingly contacting an outer wall (35) of the cylindrical part (27) of the core (26).

3. The connector (15) according to claim 2, further comprising:
a second sealing ring (47) at an outer surface of the lower transverse wall (34) for contacting the coupling head (43) of the second connector part (22).

4. The connector (15) according to claim 1, wherein each of the first and second duct sections (21, 23) comprising a valve (44, 45) situated near a respective one of the first connector part (20) and the second connector part (22).

5. The connector (15) according to claim 1, wherein,
the first duct section (21) has a length direction, and
the first connector part (20) is rotatable around an axis extending in the length direction of the first duct section.

6. The connector (15) according to claim 1, wherein,
the locking member (51) is attached to a lower part of the sleeve, is movable in a direction transversely to the axial direction, and comprises a pin extending through an opening in the longitudinal wall (37), and
the coupling head (43) of the second connector part comprises a groove (53) for engaging with the pin.

7. The connector (15) according to claim 6, further comprising:
a second locking member (50) attached to an upper part of the sleeve (30), movable in a direction transversely to the axial direction, and comprises a pin extending through an opening in the longitudinal wall, and
the transverse part (28) of the T-shaped core comprises a cavity (52) for receiving the pin.

8. The connector (15) according to claim 1, wherein,
the first duct section (21) is connected to a receiving cavity (1) of a vessel (3),
the second duct section (23) section is attached to a top (16) of a conical riser-supporting buoy (11), and
a locking member (6) on the vessel connects the buoy with the receiving cavity.

\* \* \* \* \*